No. 779,669.

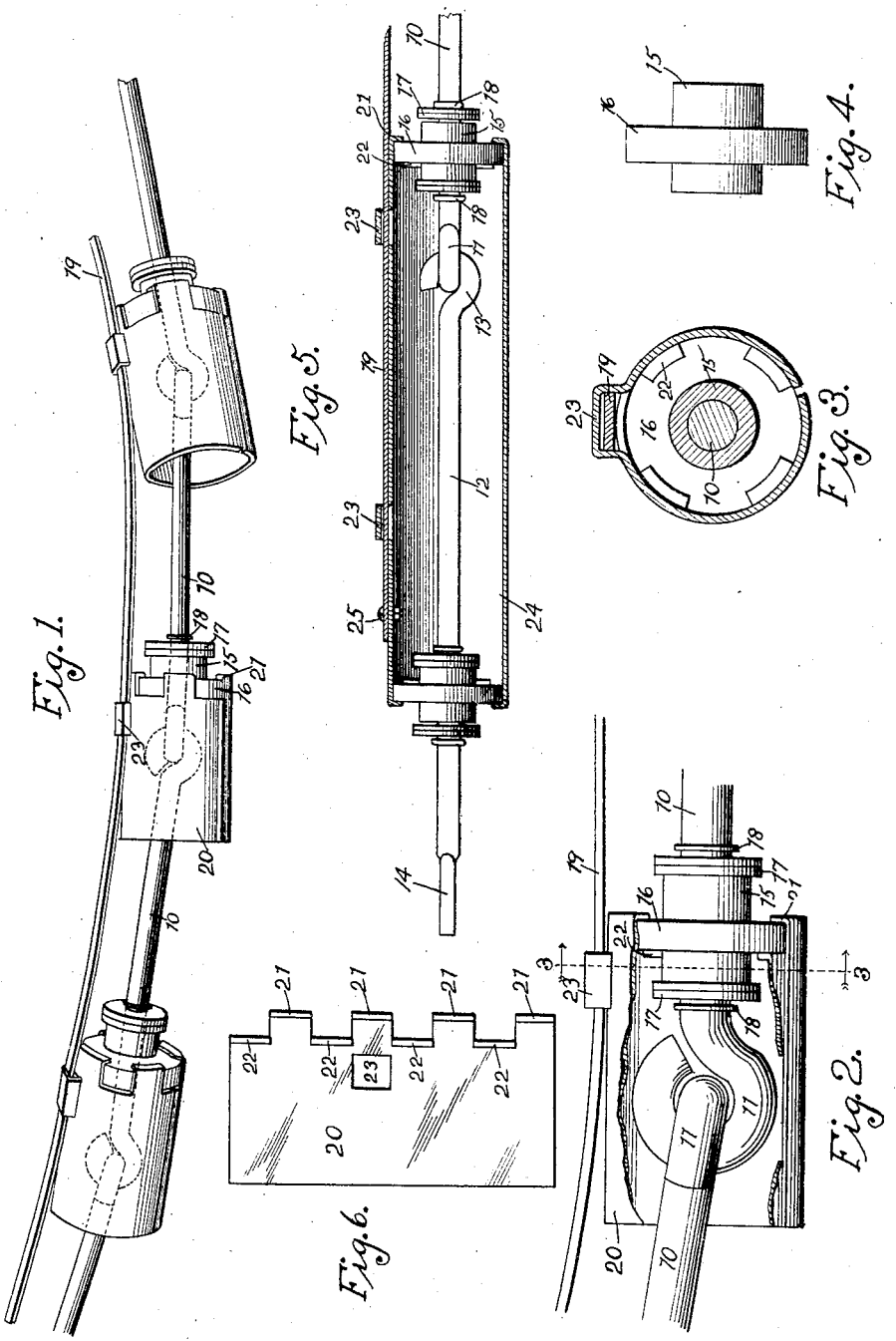

Patented January 10, 1905.

UNITED STATES PATENT OFFICE.

ROBERT SHEDENHELM, OF STERLING, ILLINOIS, ASSIGNOR TO THE KEYSTONE COMPANY, OF STERLING, ILLINOIS, A CORPORATION OF ILLINOIS.

FLEXIBLE SHAFT.

SPECIFICATION forming part of Letters Patent No. 779,669, dated January 10, 1905.

Application filed July 14, 1903. Serial No. 165,444.

*To all whom it may concern:*

Be it known that I, ROBERT SHEDENHELM, a citizen of the United States, residing at Sterling, in the county of Whiteside and State of Illinois, have invented certain new and useful Improvements in Flexible Shafts, of which the following is a specification.

My invention relates to that class of flexible shafts in which the shaft proper is composed of a series of short rigid sections connected with each other in such manner as to permit universal movement of one section relative to the other. In devices of this class it is necessary that some means be provided for preventing two adjacent sections from moving relative to each other so far as a right angle, because if moved so far as a right angle they will not transmit a rotary motion from one section to the next.

The objects of my invention are to provide means of simple, durable, and inexpensive construction by which a flexible strap of metal or other suitable material may be used in lieu of a tube for inclosing the shaft, such flexible strip performing the function of holding the shaft-sections at all times in such manner that no two of the sections may move to position at right angles to each other.

A further object is to provide means for connecting each shaft-section with the flexible strap in such manner that the connecting devices may move longitudinally relative to the shaft-supporting strap, so that the shaft taken as a whole may be curved to any desirable extent, and the shaft-section-supporting devices will engage the shaft-sections at the same places and may slide longitudinally on the shaft-supporting strap, and, further, in this connection to provide a device for supporting the shaft-sections on the flexible strap, which devices will inclose the joint connecting two shaft-sections, so that the projecting portions of the joints cannot become caught or entangled with any substance upon which it may be lying or with which it may be in contact, and so that the shaft may rest upon any surface without permitting friction between the joints and the said surface, and, further, to provide ready access to each joint, so that it may be readily oiled and cleaned.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a portion of my complete shaft. Fig. 2 shows an enlarged detail view of one of the joints of my flexible shaft, together with the connected and adjacent parts, a portion of one of the joint-protecting covers being broken away to show the construction of the joint. Fig. 3 shows a sectional view on the line 3 3 of Fig. 2. Fig. 4 shows an edge view of one of the collars for supporting the shaft-sections. Fig. 5 shows a longitudinal sectional view of one of the end portions of my improved shaft, showing the handle by which the end of the shaft may be grasped; and Fig. 6 shows a plan view of one of the protecting-covers in the flat.

Referring to the accompanying drawings, I have used the reference-numeral 10 to indicate the body portions of the shaft-sections. These body portions are straight round rods. Each end of the rod is provided with a loop 11 formed therein, the two loops of two adjacent sections being passed through each other to permit universal movement of one shaft-section relative to the other, said loops being so shaped that the body portions of two adjacent shaft-sections may stand directly in line with each other. At one end of the flexible shaft is a shaft-section 12, having at one end a loop 13, similar to the loop 11, before described, and having its other end portion squared at 14 to provide means whereby it may be connected with a device for rotating the shaft. As before explained, a shaft of this class composed of a number of short links could not be successfully used for ordinary mechanical purposes on account of the liability of two of the shaft-sections turning to a position relative to each other as great as a right angle, which would prevent one of the sections from transmitting a rotary motion to the adjacent one. I have provided means for preventing the sections from turning relative to each other so far as a right angle, as follows: Mounted upon each shaft-section adjacent to one end thereof is a hub 15, having an integral rim 16, said hub having a central opening of a size designed to admit one of the shafts 10 and to permit said shaft to freely rotate therein. This hub is placed on the shaft-section before the ends of the section are provided with loops, and on each end of the shaft I place two washers 17, which are moved to position adjacent to the ends of the hub 15, and then the hub and washers are held in position on the shaft by forming a rib 18 on the shaft adjacent to the outer surface of the outer one of the washers 17, thus providing means whereby the shaft may freely rotate in the hub with a minimum of friction, and yet the hub will be held against longitudinal movement on the shaft.

The reference-numeral 19 indicates a shaft-supporting strap which is preferably made of flexible spring metal. It is of substantially the same length as the entire shaft and may be of any suitable width and thickness. I connect each of the hubs 16 with the shaft-supporting straps as follows: Referring to Fig. 6 of the drawings, the reference-numeral 20 is used to indicate a flat piece of sheet metal of oblong shape. One of the long edges of the sheet is provided with a series of upturned lugs 21 in line with each other at the outer edge of the sheet and also with one series of upturned lugs 22 in line with each other a short distance from the same edge of the sheet, and near the central portion of the sheet I have provided an arched portion 23, projecting from the sheet in an opposite direction from the said lugs. The short edges of the sheet are then brought toward each other to form a cylinder, and the two rows of lugs on the cylinder are made to engage the opposite sides of one of the rims 16. Said lugs 21 and 22 are then made to engage the rim in such manner as to firmly hold the cylinder to the rim and to prevent the rim from rotating. The edge of the cylinder opposite from the one attached to the rim 16 projects over and covers the adjacent joint of the flexible shaft, and the strap 19 passes through the arched portion 23 in such manner that the strap may freely slide in the arched portion. At the ends of the shaft I provide a handle made of a piece of sheet metal similar to the part 20, but of much greater length and having a series of lugs 21 and 22 at each end and also having two or more arched portions 23. This handle portion is indicated in Fig. 5 of the drawings by the reference-numeral 24, and one end of the strap 19 is fixed to the handle portion by means of the bolt 25. All of the other link-supporting devices must necessarily be slidingly connected with the strap 19.

I construct my improved flexible shaft by first cutting the shaft-sections to the desired length, then placing one of the hubs 15 on each section, then putting the washers 17 on each section at the ends of the hub, and then forming a rib 18 on the section to prevent longitudinal movement of the hubs on the sections. I then form the loops in the ends of the sections and couple them to each other, as shown. I then place one of the protectors 20 on each hub, with the lugs thereof firmly clamped to the rims 16 of the hubs, and I then pass strap 19 through the arched portions of each of the supports 20, and I fix one end of the strap to the protector or handle at one end of the shaft. Assuming that it is desired to transmit a rotary motion by means of said shaft, I connect one of the end links of the chain with a device for imparting the rotary motion and then grasp the handle at the other end of the shaft. Obviously, a rotary motion is imparted from one link to the other throughout the length of the shaft, and there is a minimum of friction and loss in such transmission, because each link has a bearing of its own in its own hub. The sections composing the shaft cannot be turned to such a position where one section will reach a right angle relative to its neighbor, because the shaft-supporting strap 19 is of such rigidity that it is not capable of bending to such an extent within the length of two of the shaft-sections. Assuming that one end of the shaft is moved to a position adjacent to the other end thereof, it is obvious that the length of the shaft itself will be either greater or less than the length of the strap 19, according as the strap is placed at the outer portion or the inner portion of the circle formed by the flexible shaft. Hence when the shaft is turned to any material extent the devices which are fixed to the sections against longitudinal movement must necessarily slide upon the shaft-supporting strap 19. Hence the supports 20 are slidingly connected with said strap. Obviously, if any portion of the flexible shaft should be resting on any kind of a surface the protectors 20 would prevent the joints of the shaft from engaging such surface. Hence there could be no friction tending to prevent a rotary movement of the shaft on account of the shaft lying on any kind of a surface. It is of material advantage in a shaft of this kind that all of the joints should be readily accessible, and yet not exposed to a position where they will cause friction by resting on surfaces or where they may become entangled with the various objects, because by providing such short sections for covering the joints only all of the joints are readily accessible and may be easily oiled.

Having thus described my invention, what I claim, and desire to secure by Letters Patent of the United States therefor, is—

1. In a device of the class described, the combination of a flexible strap, a number of shaft-sections coupled together and means for rotatably supporting the shaft-sections upon the strap.

2. In a device of the class described, the combination of a flexible strap, a number of shaft-sections coupled together, hubs rotatably mounted upon the shaft-sections and means for connecting the hubs with the strap.

3. In a device of the class described, the combination of a number of rods having loops at their ends, the loops of the adjacent rods coupled together, a strap, supports slidingly mounted on the strap and rotatably supporting the said rods.

4. In a device of the class described, the combination of a number of rigid shaft-sections pivotally connected, a hub rotatable on each section, a cover carried by each hub inclosing the adjacent end of the section and a strap connecting the covers.

5. The combination of a flexible strap, a number of combined shaft supports and covers carried by the strap and a series of shaft-sections coupled together rotatably supported and having their ends within the said combined shaft supports and covers.

6. The combination of a number of rigid shaft-sections coupled together, a hub rotatably mounted on each section near one end thereof, a cover fixed to each hub and overlapping the adjacent end of the shaft-section, and a strap connected to the cover.

7. The combination of two rigid shaft-sections coupled together, a hub rotatably mounted on one of the sections near one end thereof, means for preventing longitudinal movement of the hub upon the section, a cylindrical cover fixed at one end of the hub and inclosing the adjacent end of the shaft-section, and a strap connected to the cover.

8. The combination of two rigid shaft-sections coupled together, a hub rotatably mounted upon one of the shaft-sections near one end thereof and having a projecting rim, a cylindrical cover attached at one end of said rim and inclosing the adjacent ends of the sections, and a strap connected to the cover.

9. The combination with a number of shaft-sections coupled together, of a handle therefor comprising two hubs rotatably mounted on two adjacent shaft-sections each hub formed with a projecting rim, a sheet-metal cylinder attached to both of said rims and inclosing the adjacent ends of the shaft-sections and a flexible strap secured to the cylinder.

10. The combination of a shaft-section, a hub rotatably mounted near one end of the shaft-section, two washers rotatably mounted on the shaft-section adjacent to each end of said hub, ribs on the rod adjacent to the outer faces of the outer ones of said washers preventing longitudinal movement thereof, a cylindrical cover open at both ends, one end being fixed to said hub, and a strap attached to the cover.

ROBERT SHEDENHELM.

Witnesses:
NEILS S. FROST,
JOHAN A. OSTLING.